United States Patent
Nishino et al.

(10) Patent No.: US 12,049,231 B2
(45) Date of Patent: Jul. 30, 2024

(54) INFORMATION PROCESSING APPARATUS, VEHICLE, METHOD FOR CONTROLLING INFORMATION PROCESSING APPARATUS, AND STORAGE MEDIUM

(71) Applicant: HONDA MOTOR CO., LTD., Tokyo (JP)

(72) Inventors: Tomoko Nishino, Wako (JP); Yuki Murayama, Wako (JP); Takashi Nishioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 164 days.

(21) Appl. No.: 17/679,297

(22) Filed: Feb. 24, 2022

(65) Prior Publication Data

US 2022/0306129 A1    Sep. 29, 2022

(30) Foreign Application Priority Data

Mar. 25, 2021   (JP) ................................ 2021-052009

(51) Int. Cl.
| | |
|---|---|
| *B60W 50/00* | (2006.01) |
| *B60N 2/16* | (2006.01) |
| *B60W 40/072* | (2012.01) |
| *B60W 50/10* | (2012.01) |
| *B60W 50/14* | (2020.01) |
| *G08G 1/056* | (2006.01) |
| *G08G 1/0962* | (2006.01) |

(52) U.S. Cl.
CPC ........... *B60W 50/0098* (2013.01); *B60N 2/16* (2013.01); *B60W 40/072* (2013.01); *B60W 50/10* (2013.01); *B60W 50/14* (2013.01); *G08G 1/056* (2013.01); *G08G 1/09626* (2013.01); *B60W 2552/53* (2020.02)

(58) Field of Classification Search
CPC ........... B60W 50/0098; B60W 40/072; B60W 50/10; B60W 50/14; B60W 2552/53; B60W 2556/10; B60W 30/12; B60W 30/18145; B60N 2/16; G08G 1/056; G08G 1/09626; G08G 1/167
See application file for complete search history.

(56) References Cited

U.S. PATENT DOCUMENTS

| | | | |
|---|---|---|---|
| 2017/0225618 A1* | 8/2017 | Tanaka ................. | B60N 2/0276 |
| 2018/0129981 A1* | 5/2018 | Fujimoto ............. | G08G 1/0962 |
| 2018/0215286 A1* | 8/2018 | Fujimoto ............. | B60N 2/0244 |
| 2018/0222347 A1* | 8/2018 | Hirayama .............. | B60N 2/767 |
| 2018/0257565 A1* | 9/2018 | Nogimori .............. | G06V 20/56 |
| 2019/0286136 A1* | 9/2019 | Nakatsuka ........... | G05D 1/0221 |

FOREIGN PATENT DOCUMENTS

JP        2017-068672 A      4/2017

* cited by examiner

*Primary Examiner* — Sizo B Vilakazi
*Assistant Examiner* — Susan E Scharpf
(74) *Attorney, Agent, or Firm* — Thomas| Horstemeyer, LLP

(57) ABSTRACT

An information processing apparatus that assists driving of a vehicle, the information processing apparatus comprising: a detection unit configured to detect deviation from a dividing line that defines a driving lane of the vehicle when the vehicle travels on a curve; and a control unit configured to control a process for recommending a driving posture to a driver of the vehicle based on an extending direction of the curve and a deviation direction of the dividing line from which the deviation has been detected with respect to the vehicle.

13 Claims, 12 Drawing Sheets

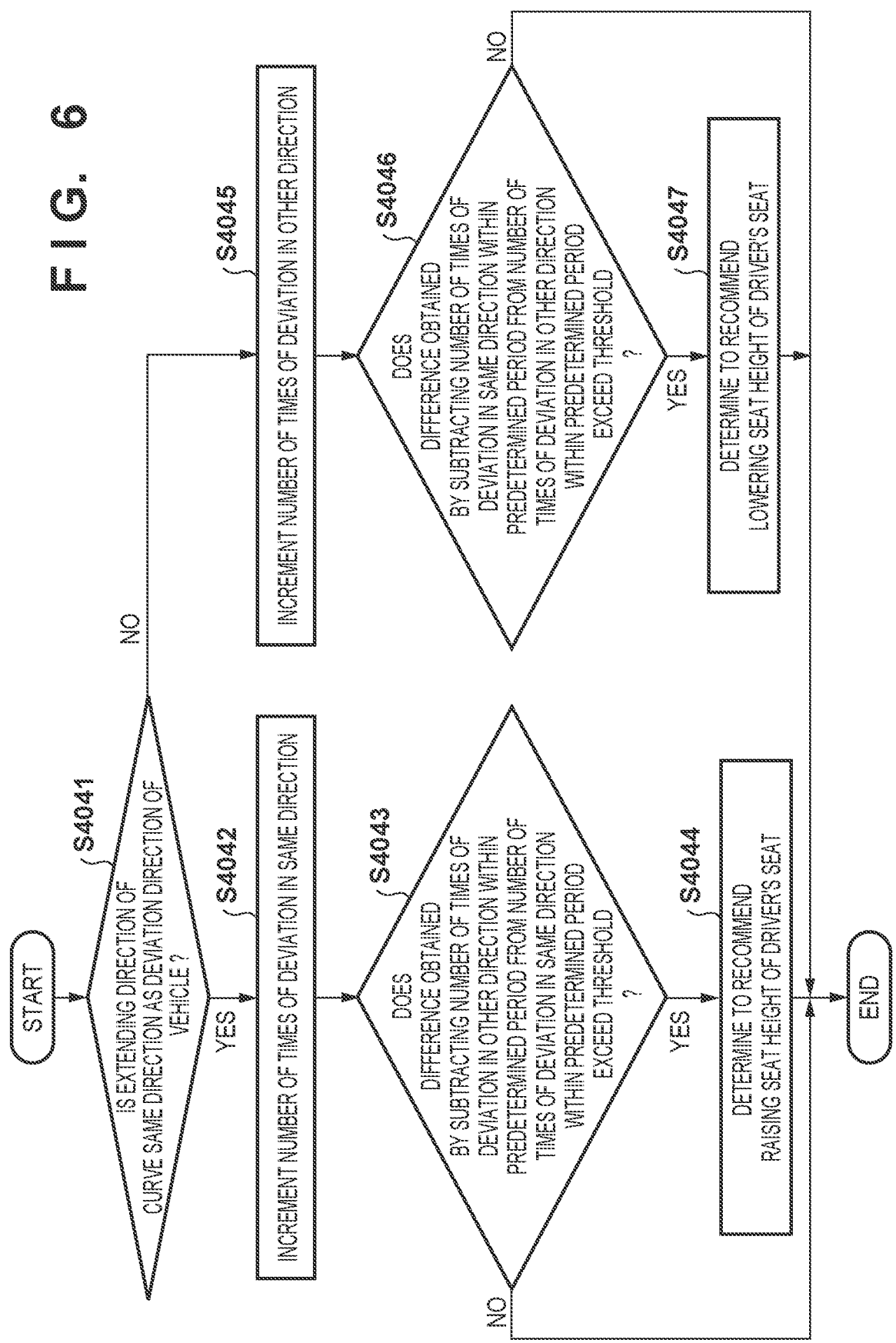

INFORMATION PROCESSING APPARATUS, VEHICLE, METHOD FOR CONTROLLING INFORMATION PROCESSING APPARATUS, AND STORAGE MEDIUM

CROSS-REFERENCE TO RELATED APPLICATION(S)

This application claims priority to and the benefit of Japanese Patent Application No. 2021-052009 filed on Mar. 25, 2021, the entire disclosure of which is incorporated herein by reference.

BACKGROUND OF THE INVENTION

Field of the Invention

The present invention relates to an information processing apparatus, a vehicle, a method for controlling an information processing apparatus, and a storage medium.

Description of the Related Art

Japanese Patent Laid-Open No. 2017-068672 discloses that when a situation around a vehicle changes, a notification or an alarm is used to prompt a driver to correct a driving posture as necessary and cause the driver to check the change in the situation around the vehicle.

However, in the technique described in Japanese Patent Laid-Open No. 2017-068672, the direction of deviation from a driving lane is not considered in improving the driving posture.

The present invention provides a technique for recommending an appropriate posture in consideration of the direction of deviation from a driving lane.

SUMMARY OF THE INVENTION

According to one aspect of the present invention, there is provided an information processing apparatus that assists driving of a vehicle, the information processing apparatus comprising:

a detection unit configured to detect deviation from a dividing line that defines a driving lane of the vehicle when the vehicle travels on a curve; and a control unit configured to control a process for recommending a driving posture to a driver of the vehicle based on an extending direction of the curve and a deviation direction of the dividing line from which the deviation has been detected with respect to the vehicle.

BRIEF DESCRIPTION OF THE DRAWINGS

FIG. 6 is a flowchart illustrating a procedure of a detailed process of S304 performed by an information processing apparatus according to a second embodiment;

DESCRIPTION OF THE EMBODIMENTS

Figure 1:
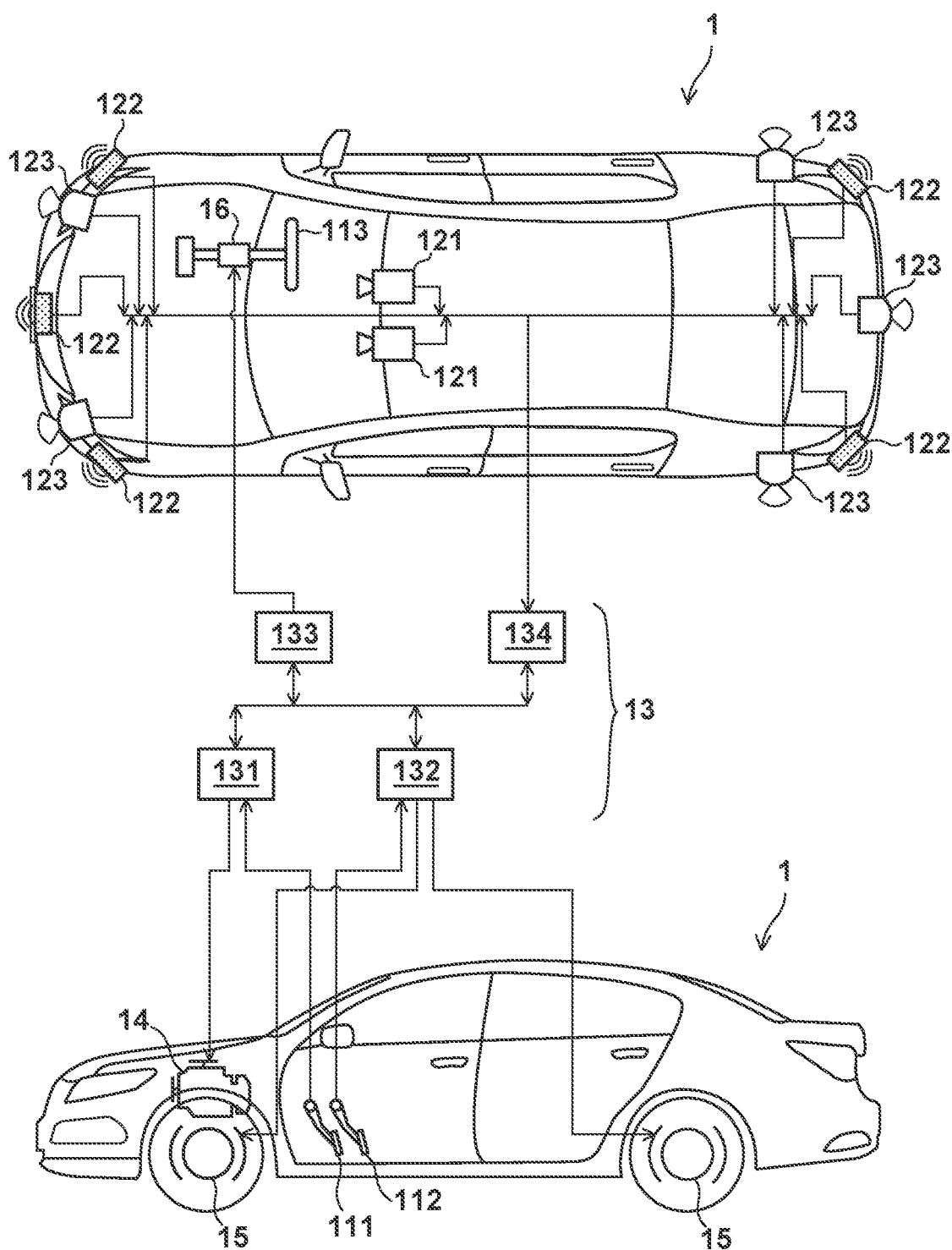
FIG. 1 is a diagram for describing a configuration example of a vehicle according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

<Configuration of Vehicle>

Figure 2:
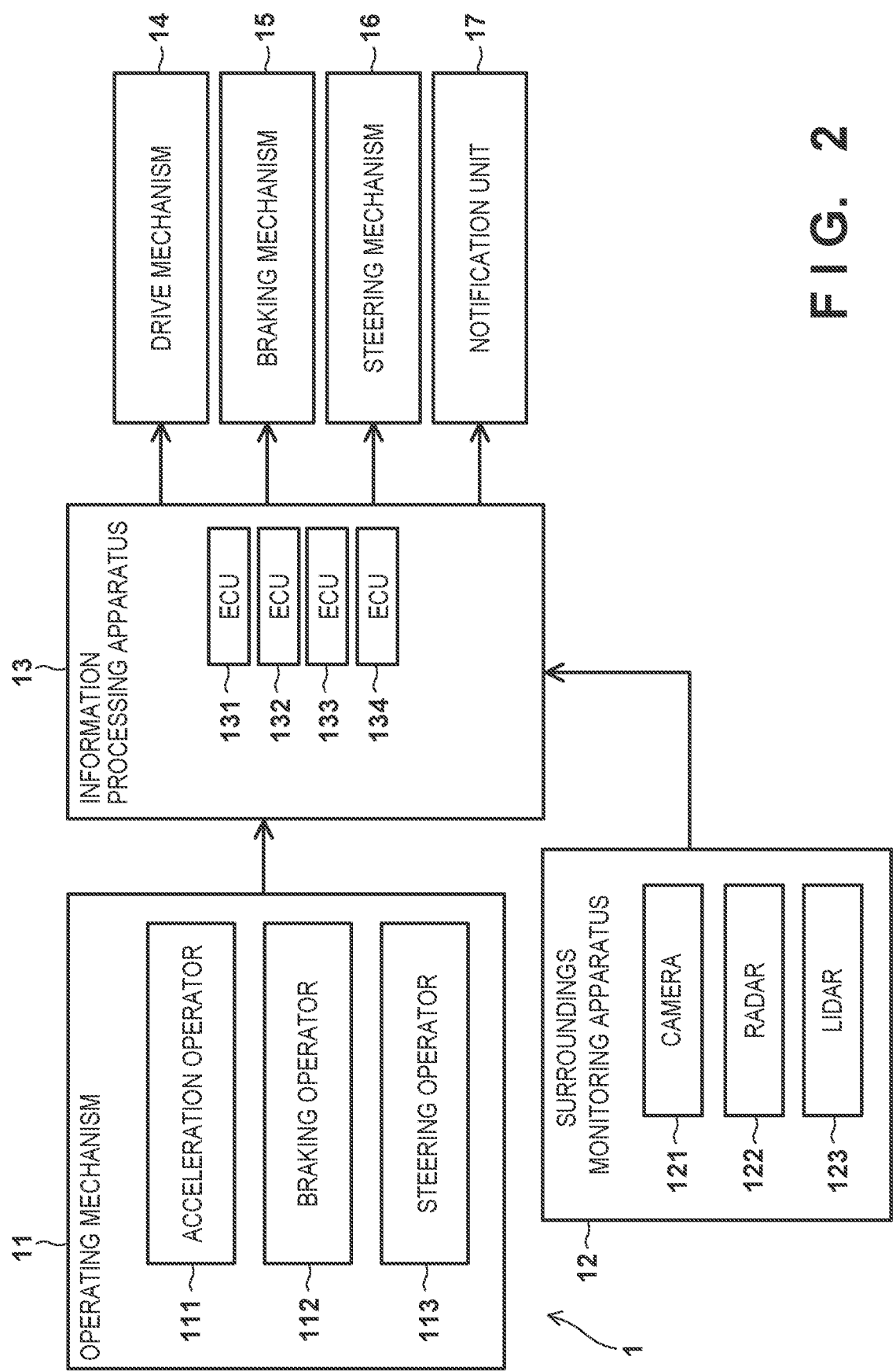
FIG. 2 is a block diagram for describing a configuration example of the vehicle according to the embodiment of the present invention.

FIGS. 1 and 2 are diagrams for describing a configuration of a vehicle 1 according to the present embodiment. FIG. 1 illustrates arrangement positions of elements described below and connection relationships between the elements by using a top view and a side view of the vehicle 1. FIG. 2 is a system block diagram of the vehicle 1.

In the following description, expressions such as front/back, up/down, and sides (left/right) may be used as expressions indicating relative directions indicated with respect to the vehicle body of the vehicle 1 as a reference. For example, the term "front" indicates the front of the vehicle body as seen in the front-and-rear direction, and the term "upper" indicates the height direction of the vehicle body.

As illustrated in FIG. 2, the vehicle 1 includes an operating mechanism 11, a surroundings monitoring apparatus 12, an information processing apparatus 13, a drive mechanism 14, a braking mechanism 15, a steering mechanism 16, and a notification unit 17. In the present embodiment, the vehicle 1 is a four-wheeled vehicle, but the number of wheels is not limited thereto.

The operating mechanism 11 includes an acceleration operator 111, a braking operator 112, and a steering operator 113. Typically, the acceleration operator 111 is an accelerator pedal, the braking operator 112 is a brake pedal, and the steering operator 113 is a steering wheel. However, these operators 111 to 113 may be of other types such as a lever type and a button type.

The surroundings monitoring apparatus 12 includes a camera 121, a radar 122, and a light detection and ranging (LiDAR) 123, all of which function as sensors for monitoring or detecting the surrounding environment of the vehicle (self-vehicle) 1. The camera 121 is an imaging device using, for example, a charge-coupled device (CCD) image sensor, a complementary metal oxide semiconductor (CMOS) image sensor, or the like. The radar 122 is, for example, a ranging device such as a millimeter wave radar. The LiDAR 123 is, for example, a ranging device such as a laser radar. As illustrated in FIG. 1, these components are disposed at positions where the surrounding environment of the vehicle 1 can be detected, for example, on the front side, the rear side, the upper side, and the lateral sides of the vehicle body.

Examples of the surrounding environment of the vehicle 1 described above include a travel environment of the vehicle 1 and an environment (extending direction of lanes, travelable areas, colors of traffic signals, and the like) around the vehicle 1 related thereto, and object information (presence or absence of objects such as other vehicles, pedestrians, and obstacles, and attributes, positions, directions and speeds of movement of the objects, and the like) around the vehicle 1. From this viewpoint, the surroundings monitoring apparatus 12 may be represented as a detection device or the like for detecting the surrounding information of the vehicle 1.

The information processing apparatus 13 is configured to be capable of controlling the vehicle 1, and controlling the mechanisms 14 to 16 and the notification unit 17 based on a signal from the operating mechanism 11 and/or the surroundings monitoring apparatus 12, for example. The information processing apparatus 13 includes a plurality of electronic control units (ECUs) 131 to 134. Each ECU includes one or more central processing units (CPUs), one or more memories, and a communication interface. Each ECU reads one or more programs from one or more memories by one or more CPUs, based on information (data or electric signals) that has been received via the communication interface, and executes a process. Then, a result of the process is stored in one or more memories, or is output to another element via the communication interface.

The ECU 131 is an acceleration ECU, and controls the drive mechanism 14 described later based on, for example, the amount of operation of the acceleration operator 111 by the driver. The ECU 132 is a braking ECU, and controls the braking mechanism 15 based on, for example, the amount of operation of the braking operator 112 by the driver. The braking mechanism 15 is, for example, a disc brake provided on each wheel. The ECU 133 is a steering ECU, and controls the steering mechanism 16 based on, for example, the amount of operation of the steering operator 113 by the driver. The steering mechanism 16 includes, for example, a power steering.

The ECU 134 is an analysis ECU provided in correspondence with the surroundings monitoring apparatus 12. The ECU 134 performs predetermined analysis/processing based on the surrounding environment of the vehicle 1 obtained by the surroundings monitoring apparatus 12, and outputs results of the analysis/processing to the ECUs 131 to 133. That is, the ECUs 131 to 133 can control the mechanisms 14 to 16 based on a signal obtained from the ECU 134. According to such a configuration, the information processing apparatus 13 can control traveling of the vehicle 1 in accordance with the surrounding environment.

The ECU 134 also controls the operation of the notification unit 17. The notification unit 17 may be, for example, a display unit such as a light emitting diode (LED) display, a light source (a daylight, a position light, or the like) that can blink or turn on light, or a sound source (a speaker or the like) that can emit sound. The notification unit 17 can notify the occupant of various information by using display on a display, light, sound, vibration, or the like. Furthermore, the notification unit 17 may be configured to notify various types of information to objects such as other vehicles and pedestrians around the vehicle 1.

Note that the information processing apparatus 13 is not limited to the illustrated configuration. For example, semiconductor devices such as application specific integrated circuits (ASICs) may be used for the ECUs 131 to 134. That is, the functions of the ECUs 131 to 134 can be implemented by either hardware or software. Some or all of the ECUs 131 to 134 may be configured as a single ECU.

<Process>

Figure 3:
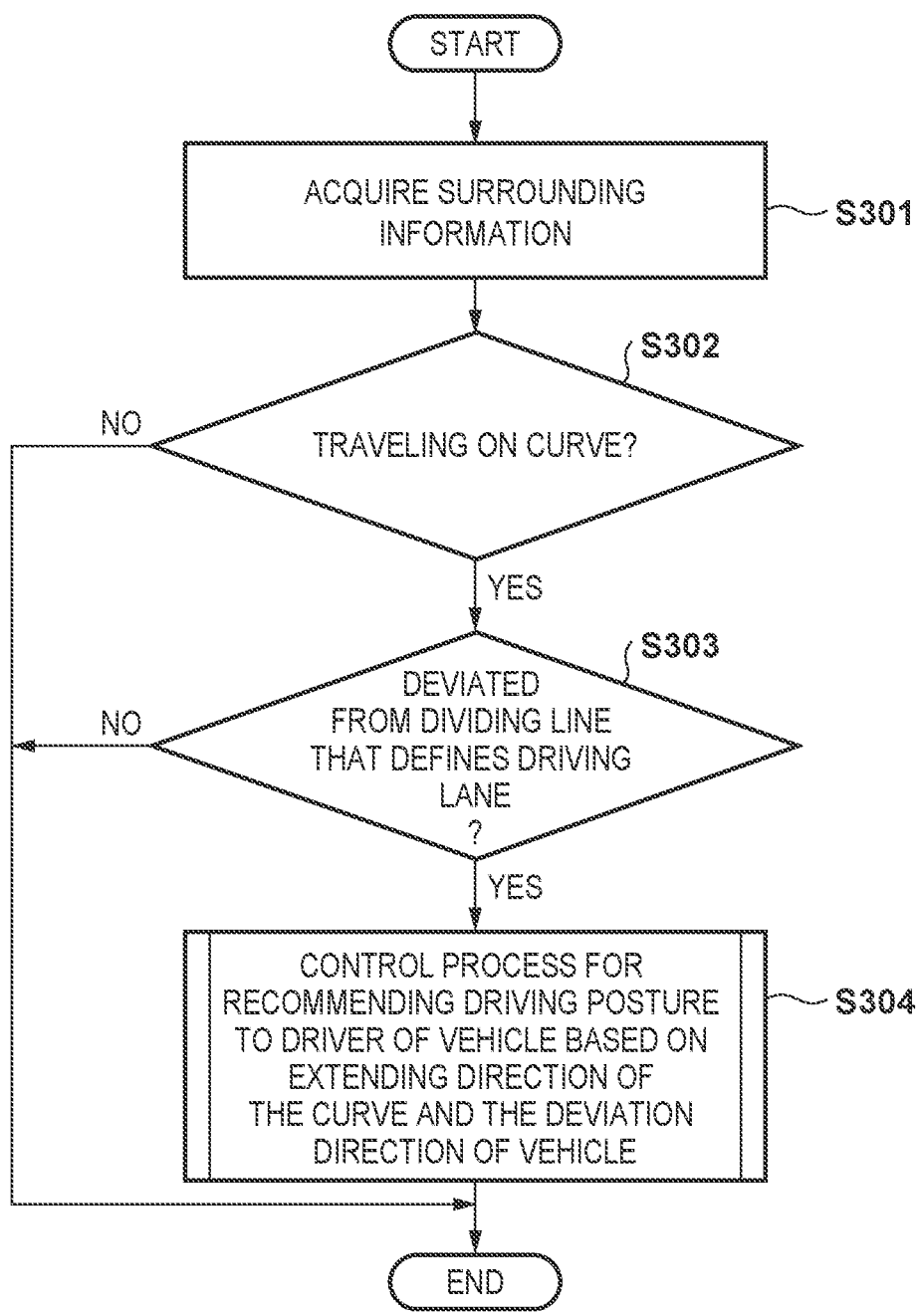
FIG. 3 is a flowchart illustrating a procedure of an overall process performed by an information processing apparatus according to the embodiment of the present invention.
Figure 4:
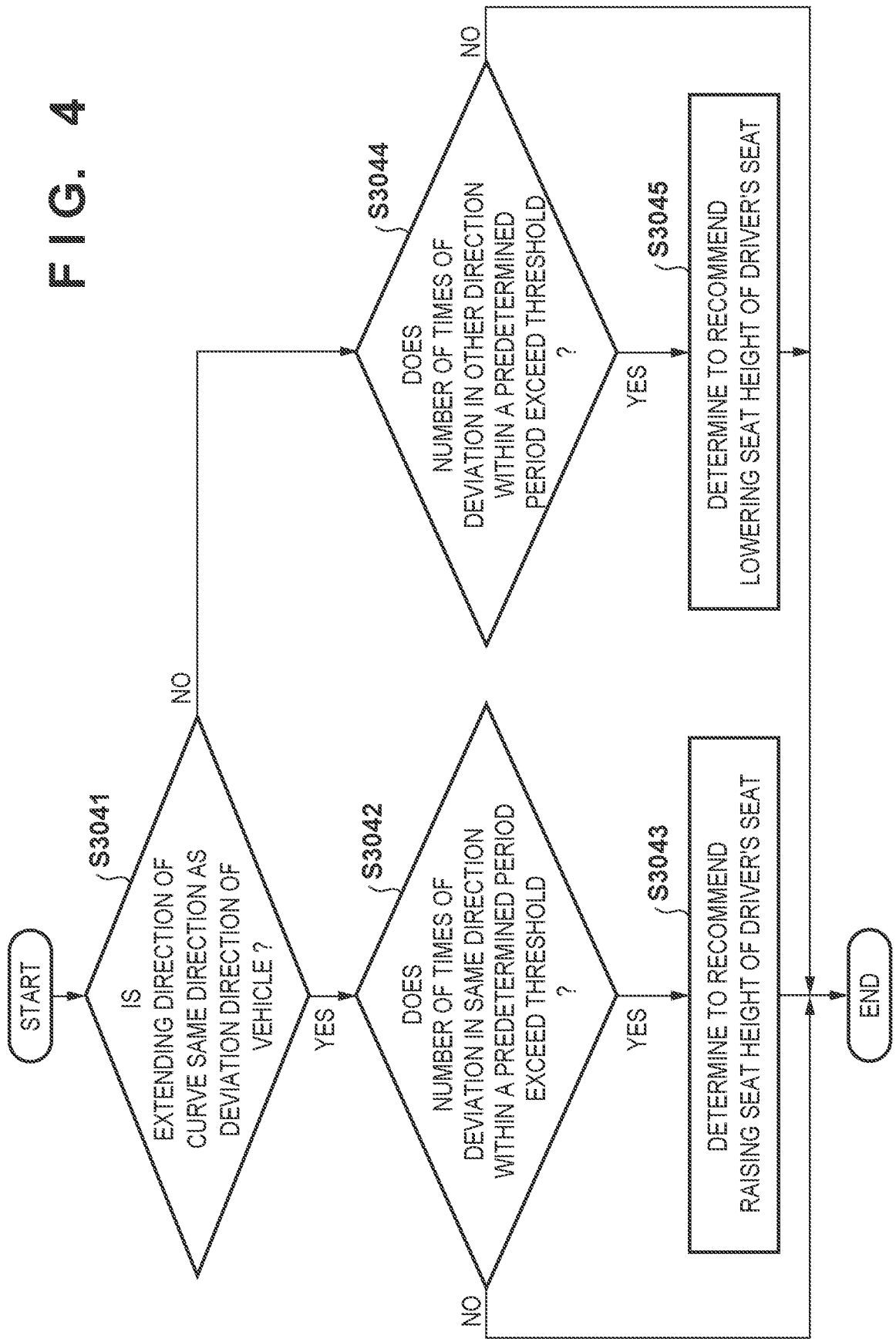
FIG. 4 is a flowchart illustrating a procedure of a detailed process of S304 performed by an information processing apparatus according to a first embodiment.
Figure 5:
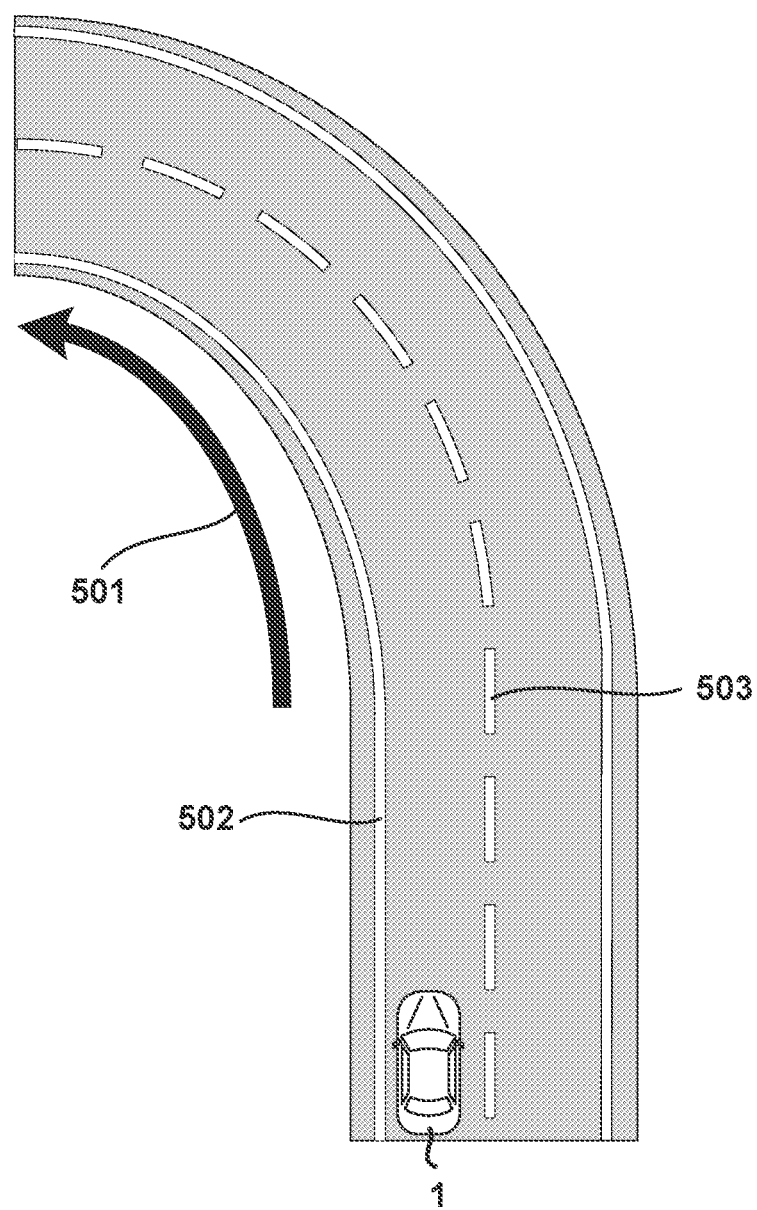
FIG. 5 is a diagram illustrating an example of an application scene in which the process according to the embodiment of the present invention is applied.

Next, a procedure of a process performed by the ECU 134 of the information processing apparatus 13 according to the present embodiment will be described with reference to FIGS. 3 to 5. FIG. 3 illustrates an overall process according to the present embodiment, and FIG. 4 illustrates a detailed process of S304 illustrated in FIG. 3. FIG. 5 illustrates an example of an application scene of the process according to the present embodiment. As illustrated in FIG. 5, a scene in which the vehicle 1 travels on a curve is assumed. In the present embodiment, for example, when the radius R is 400 m or less, the curve is identified, but the present invention is not limited to this value.

First, the overall process is described with reference to the flowchart illustrated in FIG. 3. In S301, the ECU 134 acquires surrounding information of the vehicle 1 from the surroundings monitoring apparatus 12.

In S302, the ECU 134 determines whether the vehicle 1 has traveled on a curve based on the surrounding information acquired in S301. When the vehicle has traveled on the curve, the process proceeds to S303. On the other hand, when the vehicle has not traveled on the curve, the process ends.

In S303, the ECU 134 determines, based on the surrounding information acquired in S301, whether the vehicle 1 has deviated from a dividing line (a dividing line 502 and a dividing line 503 in an example of FIG. 5, and the dividing line 503 is the central line in the example of FIG. 5) defining a driving lane on which the vehicle 1 travels. For example, the ECU 134 determines that at least a part of the vehicle body of the vehicle 1 has deviated by going out of the dividing line. The deviation can be determined based on a recorded travel trajectory of the vehicle 1 and the acquired shape of the curve after traveling on the curve. When the vehicle 1 has deviated from the dividing line, the process proceeds to S304. On the other hand, when the vehicle 1 has not deviated from the dividing line, the process is ended.

In S304, the ECU 134 controls the process for recommending to the driver of the vehicle 1 a driving posture based on the extending direction of the curve and the deviation direction of the dividing line from which the deviation has been detected with respect to the vehicle 1. In the example of FIG. 5, the extending direction 501 of the curve is the left direction. Further, when the dividing line where the deviation is detected is the dividing line 502, the deviation direction is the left direction, and when the dividing line where the deviation is detected is the dividing line 503, the deviation direction is the right direction. Accordingly, the series of processes illustrated in FIG. 3 is ended.

Next, a detailed process of S304 illustrated in FIG. 3 will be described with reference to a flowchart illustrated in FIG. 4. In S3041, the ECU 134 determines whether the extending direction of the curve is the same direction as the deviation direction in which the vehicle 1 deviates from the dividing line. When the extending direction of the curve is the same direction, the process proceeds to S3042. On the other hand, when the extending direction of the curve is the other direction (opposite direction), the process proceeds to S3044.

In S3042, the ECU 134 determines whether the number of times of deviation in the same direction within a predetermined period (for example, one month) exceeds a threshold. When the number of times of deviation in the same direction within the predetermined period exceeds the threshold, the process proceeds to S3043. On the other hand, when the number of times of deviation in the same direction within the predetermined period does not exceed the threshold, the process ends.

In S3043, the ECU 134 determines to recommend raising the seat height of the driver's seat. When the seat height of the driver's seat is low, the line of sight of the occupant tends to be farther than a reference point, and it is difficult to see a position close to the vehicle 1. Therefore, it is easy to perform the steering operation while looking at a distant situation, and the timing of the steering is advanced, so that deviation is likely to occur. Therefore, deviation from the dividing line in the same direction as the extending direction of the curve is likely to occur. Therefore, when deviation in the same direction as the extending direction of the curve frequently occurs, the ECU 134 determine to recommend raising the seat height of the driver's seat.

For example, at this time, the ECU 134 may control the notification unit 17 to recommend raising the seat height of the driver's seat by voice. However, since the driver is driving the vehicle 1, excessive recommendation is not performed, and when the vehicle 1 stops next (for example, when the engine is stopped), a specific recommendation content may be notified by voice and/or display on the display unit. Alternatively, the recommendation content may be notified at the next ride (for example, when the engine is stopped after parking and then the engine is started) without the notification at this time.

In S3044, the ECU 134 determines whether the number of times of deviation in the other direction within a predetermined period (for example, one month) exceeds a threshold. When the number of times of deviation in the other direction within the predetermined period exceeds the threshold, the process proceeds to S3045. On the other hand, when the number of times of deviation in the other direction within the predetermined period does not exceed the threshold, the process ends.

In S3045, the ECU 134 determines to recommend lowering the seat height of the driver's seat. When the seat height of the driver's seat is high, the line of sight of the occupant tends to be closer than the reference point, and it is easier to pay attention to a position close to the vehicle 1 than a position far from the vehicle 1. Therefore, it is easy to perform the steering operation while looking at a close situation, and that causes the delay on noticing the curve and the timing of the steering, so that deviation is likely to occur. Therefore, deviation from the dividing line in the direction opposite to the extending direction of the curve is likely to occur. Therefore, when deviation in the direction opposite to the extending direction of the curve frequently occurs, the ECU 134 determines to recommend lowering the seat height of the driver's seat.

For example, at this time, the ECU 134 may control the notification unit 17 to recommend lowering the seat height of the driver's seat by voice. However, since the driver is driving the vehicle 1, excessive recommendation is not performed, and when the vehicle 1 stops next (for example, when the engine is stopped), a specific recommendation content may be notified by voice and/or display on the display unit. Alternatively, the recommendation content may be notified at the next ride (for example, when the engine is stopped after parking and then the engine is started) without the notification at this time. Accordingly, the series of processes illustrated in FIG. 4 is ended.

As described above, in the present embodiment, when the vehicle travels on the curve, the deviation from the dividing line that defines the driving lane of the vehicle is detected, and the process for recommending a driving posture to the driver of the vehicle is controlled based on the extending direction of the curve and the deviation direction of the dividing line from which the deviation has been detected with respect to the vehicle. Since there is a pattern in the deviation direction during traveling on the curve according to the driving posture (in particular, the height of the eye line), it is possible to recommend an appropriate posture by considering the deviation direction from the driving lane. In addition, it is possible to recommend an appropriate driving posture in response to a change in the position of the line of sight due to aging (for example, a change such as lowering of the line of sight due to bending of the waist) that is difficult for the driver to notice.

In addition, in the present embodiment, the recommendation process of a driving posture is controlled based on whether the extending direction of the curve is the same direction as or opposite direction to the deviation direction of the vehicle. As a result, it is possible to recommend an appropriate driving posture based on whether there are many deviations in the same direction as the extending direction of the curve or there are many deviations in the other direction.

Second Embodiment

In the first embodiment, the example is described in which an appropriate driving posture is recommended when the number of times of deviation in the same direction as the extending direction of the curve within the predetermined period or the number of times of deviation in the other direction within the predetermined period exceeds the threshold. On the other hand, in the present embodiment, an example will be described in which the recommendation of a driving posture is controlled according to the difference between the number of times of deviation in the same direction as the extending direction of the curve and the number of times of deviation in the other direction. Since the device configuration and the application scene of the process are similar to those described in the first embodiment, the description thereof will be omitted.
<Process>

Since the overall process is similar to that illustrated in FIG. 3, the description thereof will be omitted. Next, a detailed process of S304 illustrated in FIG. 3 according to the present embodiment will be described with reference to a flowchart illustrated in FIG. 6.

In S4041, the ECU 134 determines whether the extending direction of the curve is the same direction as the direction in which the vehicle 1 deviates from the dividing line. When the extending direction of the curve is the same direction, the process proceeds to S4042. On the other hand, when the extending direction of the curve is the other direction (opposite direction), the process proceeds to S4045.

In S4042, the ECU 134 increments the number of times of deviation in the same direction. That is, 1 is added to the number of times of deviation.

After the addition in S4042, in S4043, the ECU 134 determines whether the difference obtained by subtracting the number of times of deviation in the other direction within the predetermined period (for example, one month) from the number of times of deviation in the same direction within the predetermined period exceeds a threshold. For example, when the number of times of deviation in the same direction within the predetermined period (one month) is 10, the number of times of deviation in the other direction is 5, and the threshold is 4, 10 times−5 times=5 times>the threshold of 4, and thus the ECU 134 determines that the difference exceeds the threshold. On the other hand, when the number of times of deviation in the same direction within the predetermined period (one month) is 10, the number of times of deviation in the other direction is 10, and the threshold is 4, 10 times−10 times=0 times<the threshold of 4, and thus the ECU 134 determines that the difference does not exceed the threshold. When the difference of the number of times of deviation exceeds the threshold, the process proceeds to S4044. On the other hand, when the difference of the number of times of deviation does not exceed the threshold, the process ends.

In S4044, the ECU 134 determines to recommend raising the seat height of the driver's seat. The method of the recommendation and the timing of the recommendation are similar to those in step S3043 illustrated in FIG. 4. In the present embodiment, even in a case where the number of times of deviation in the same direction is large, when the number of times of deviation in the same direction is the same as or close to the number of times of deviation in the other direction, the process for recommending an appropriate driving posture is not performed. This is because, when deviation in the same direction and deviation in other directions occur at similar frequencies, there is a possibility that there is a problem in driving skills rather than a possibility that the driving posture is inappropriate. As a result, the recommendation process can be performed only when the driving posture is inappropriate, so that more appropriate recommendation can be made.

In S4045, the ECU 134 increments the number of times of deviation in the other direction. That is, 1 is added to the number of times of deviation.

After the addition in S4045, in S4046, the ECU 134 determines whether the difference obtained by subtracting the number of times of deviation in the same direction within the predetermined period (for example, one month) from the number of times of deviation in the other direction within the predetermined period exceeds a threshold. For example, when the number of times of deviation in the other direction within the predetermined period (one month) is 10, the number of times of deviation in the same direction is 5, and the threshold is 4, 10 times−5 times=5 times>the threshold of 4, and thus the ECU 134 determines that the difference exceeds the threshold. On the other hand, when the number of times of deviation in the other direction within the predetermined period (one month) is 10, the number of times of deviation in the same direction is 10, and the threshold is 4, 10 times−10 times=0 times<the threshold of 4, and thus the ECU 134 determines that the difference does not exceed the threshold. When the difference of the number of times of deviation exceeds the threshold, the process proceeds to S4047. On the other hand, when the difference of the number of times of deviation does not exceed the threshold, the process ends.

In S4047, the ECU 134 determines to recommend lowering the seat height of the driver's seat. The method of the recommendation and the timing of the recommendation are similar to those in step S3045 illustrated in FIG. 4. In the present embodiment, even in a case where the number of times of deviation in the other direction is large, when the number of times of deviation in the same direction is the same as or close to the number of times of deviation in the other direction, the process for recommending an appropriate driving posture is not performed. This is because, when deviation in the other direction and deviation in the same direction occur at similar frequencies, there is a possibility that there is a problem in driving skills rather than a possibility that the driving posture is inappropriate. As a result, the recommendation process can be performed only when the driving posture is inappropriate, so that more appropriate recommendation can be made. Accordingly, the series of processes illustrated in FIG. 6 is ended.

On the other hand, in the present embodiment, the recommendation of a driving posture is controlled according to the difference between the number of times of deviation in the same direction as the extending direction of the curve and the number of times of deviation in the other direction. As a result, it is possible to distinguish whether the deviation is caused by the driving posture or caused by the driving skills, and to recommend an appropriate driving posture only when the deviation is estimated to be caused by the driving posture.

Third Embodiment

In the second embodiment, the example is described in which the recommendation of a driving posture is controlled according to the difference between the number of times of deviation in the same direction as the extending direction of the curve and the number of times of deviation in the other direction. On the other hand, in the present embodiment, an example will be described in which the recommendation of a driving posture is controlled according to whether the difference between the number of times of deviation in the same direction as the extending direction of the curve and the number of times of deviation in the other direction increases by a predetermined rate or higher. Since the device configuration and the application scene of the process are similar to those described in the first embodiment, the description thereof will be omitted.

<Process>

Since the overall process is similar to that illustrated in FIG. 3, the description thereof will be omitted. Next, a detailed process of S304 illustrated in FIG. 3 according to the present embodiment will be described with reference to a flowchart illustrated in FIGS. 7A and 7B.

In S5041, the ECU 134 determines whether the extending direction of the curve is the same direction as the direction in which the vehicle 1 deviates from the dividing line. When the extending direction of the curve is the same direction, the process proceeds to S5042. On the other hand, when the extending direction of the curve is the other direction (opposite direction), the process proceeds to S5049.

In S5042, the ECU 134 increments the number of times of deviation in the same direction. That is, 1 is added to the number of times of deviation.

In S5043, the ECU 134 counts the number of times of deviation in the same direction and the number of times of deviation in the other direction within a first predetermined period (for example, a time period from two months ago to one month ago).

In S5044, the ECU 134 calculates a first difference obtained by subtracting the number of times of deviation in the other direction within the first predetermined period (for example, the time period from two months ago to one month ago) from the number of times of deviation in the same direction within the first predetermined period.

In S5045, the ECU 134 counts the number of times of deviation in the same direction and the number of times of deviation in the other direction within a second predetermined period (for example, a time period from one month ago to the present).

In S5046, the ECU 134 calculates a second difference obtained by subtracting the number of times of deviation in the other direction within the second predetermined period (for example, the time period from one month ago to the present) from the number of times of deviation in the same direction within the second predetermined period.

In S5047, the ECU 134 determines whether the difference of the numbers of times of deviation increases by the predetermined rate or higher in the second predetermined period with respect to the first predetermined period. That is, the ECU 134 determines whether "(the second difference–the first difference)/the first difference>the predetermined rate" is satisfied. For example, when the first difference within the first predetermined period is 40, the second difference within the second predetermined period is 45, and the predetermined rate is 10%, (45−40)/40=12.5%>the predetermined rate of 10%, and thus the ECU 134 determines that the difference of the numbers of times of deviation has increased by the predetermined rate or higher. For example, when the first difference within the first predetermined period is 40, the second difference within the second predetermined period is 41, and the predetermined rate is 10%, (41−40)/40=2.5%<the predetermined rate of 10%, and thus the ECU 134 determines that the difference of the numbers of times of deviation has not increased by the predetermined rate or higher. When the difference of the numbers of times of deviation increases by the predetermined rate or higher, the process proceeds to S5048. On the other hand, when the difference of the numbers of times of deviation does not exceed the predetermined rate, the process ends.

In S5048, the ECU 134 determines to recommend raising the seat height of the driver's seat. The method of the recommendation and the timing of the recommendation are similar to those in step S3043 illustrated in FIG. 4. In the present embodiment, even in a case where the number of times of deviation in the same direction is large, when the number of times of deviation in the other direction is the same as or close to the number of times of deviation in the same direction, it is determined that the deviation is caused by the driving skills, and the process for recommending an appropriate driving posture is not performed. As a result, it is possible to distinguish whether the deviation is caused by the driving posture or caused by the driving skills, and to recommend an appropriate driving posture only when the deviation is estimated to be caused by the driving posture.

Furthermore, by comparing the difference of the numbers of times of deviation within a predetermined period with the difference of the numbers of times of deviation within a previous predetermined period, it is possible to grasp whether the difference of the numbers of times of deviation tends to increase and configured so as to recommend an appropriate driving posture when the difference of the numbers of times of deviation tends to increase. As a result, an appropriate driving posture can be recommended in a case where the posture gradually changes to an inappropriate posture without the driver's awareness.

In S5049, the ECU 134 increments the number of times of deviation in the other direction. That is, 1 is added to the number of times of deviation.

In S5050, the ECU 134 counts the number of times of deviation in the same direction and the number of times of deviation in the other direction within the first predetermined period (for example, the time period from two months ago to one month ago).

In S5051, the ECU 134 calculates a third difference obtained by subtracting the number of times of deviation in the same direction within the first predetermined period (for example, the time period from two months ago to one month ago) from the number of times of deviation in the other direction within the first predetermined period.

In S5052, the ECU 134 counts the number of times of deviation in the same direction and the number of times of deviation in the other direction within the second predetermined period (for example, the time period from one month ago to the present).

In S5053, the ECU 134 calculates a fourth difference obtained by subtracting the number of times of deviation in the same direction within the second predetermined period (for example, the time period from one month ago to the present) from the number of times of deviation in the other direction within the second predetermined period.

In S5054, the ECU 134 determines whether the difference of the numbers of times of deviation increases by the predetermined rate or higher in the second predetermined period with respect to the first predetermined period. That is, the ECU 134 determines whether "(the fourth difference–the third difference)/the third difference>the predetermined rate" is satisfied. For example, when the third difference within the first predetermined period is 40, the fourth difference within the second predetermined period is 45, and the predetermined rate is 10%, (45−40)/40=12.5%≥the predetermined rate of 10%, and thus the ECU 134 determines that the difference of the numbers of times of deviation has increased by the predetermined rate or higher. For example, when the third difference within the first predetermined period is 40, the fourth difference within the second predetermined period is 41, and the predetermined rate is 10%, (41−40)/40=2.5%<the predetermined rate of 10%, and thus the ECU 134 determines that the difference of the numbers of times of deviation has not increased by the predetermined rate or higher. When the difference of the numbers of times of deviation increases by the predetermined rate or higher, the process proceeds to S5055. On the other hand, when the difference of the numbers of times of deviation does not exceed the predetermined rate, the process ends.

In S5055, the ECU 134 determines to recommend lowering the seat height of the driver's seat. The method of the recommendation and the timing of the recommendation are similar to those in step S3045 illustrated in FIG. 4. In the present embodiment, even in a case where the number of times of deviation in the other direction is large, when the number of times of deviation in the same direction is the same as or close to the number of times of deviation in the other direction, it is determined that the deviation is caused by the driving skills, and the process for recommending an appropriate driving posture is not performed. As a result, it is possible to distinguish whether the deviation is caused by the driving posture or caused by the driving skills, and to recommend an appropriate driving posture only when the deviation is estimated to be caused by the driving posture.

Figure 7A:
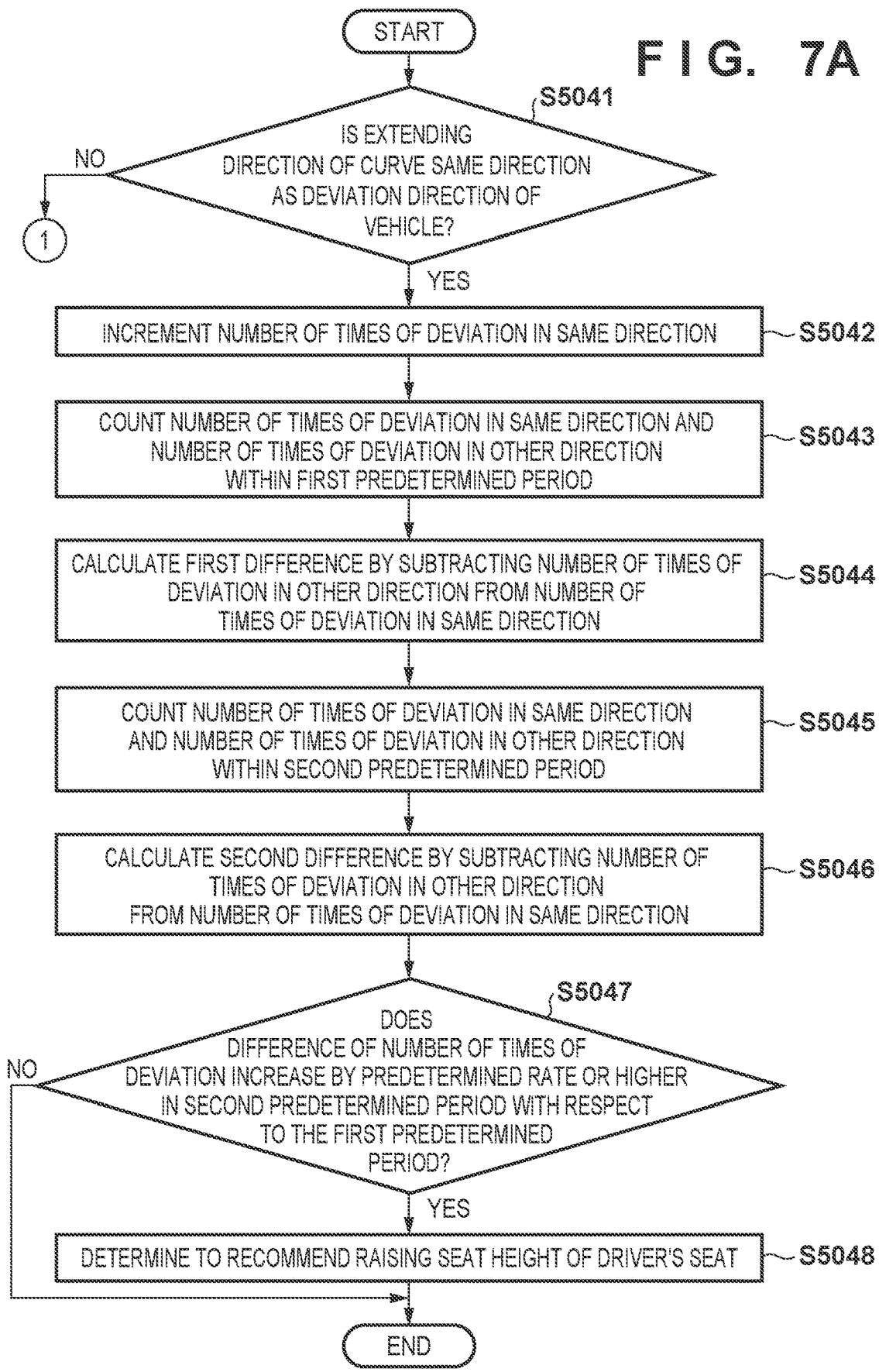
FIGS. 7A and 7B are a flowchart illustrating a procedure of a detailed process of S304 performed by an information processing apparatus according to a third embodiment.
Figure 7B:
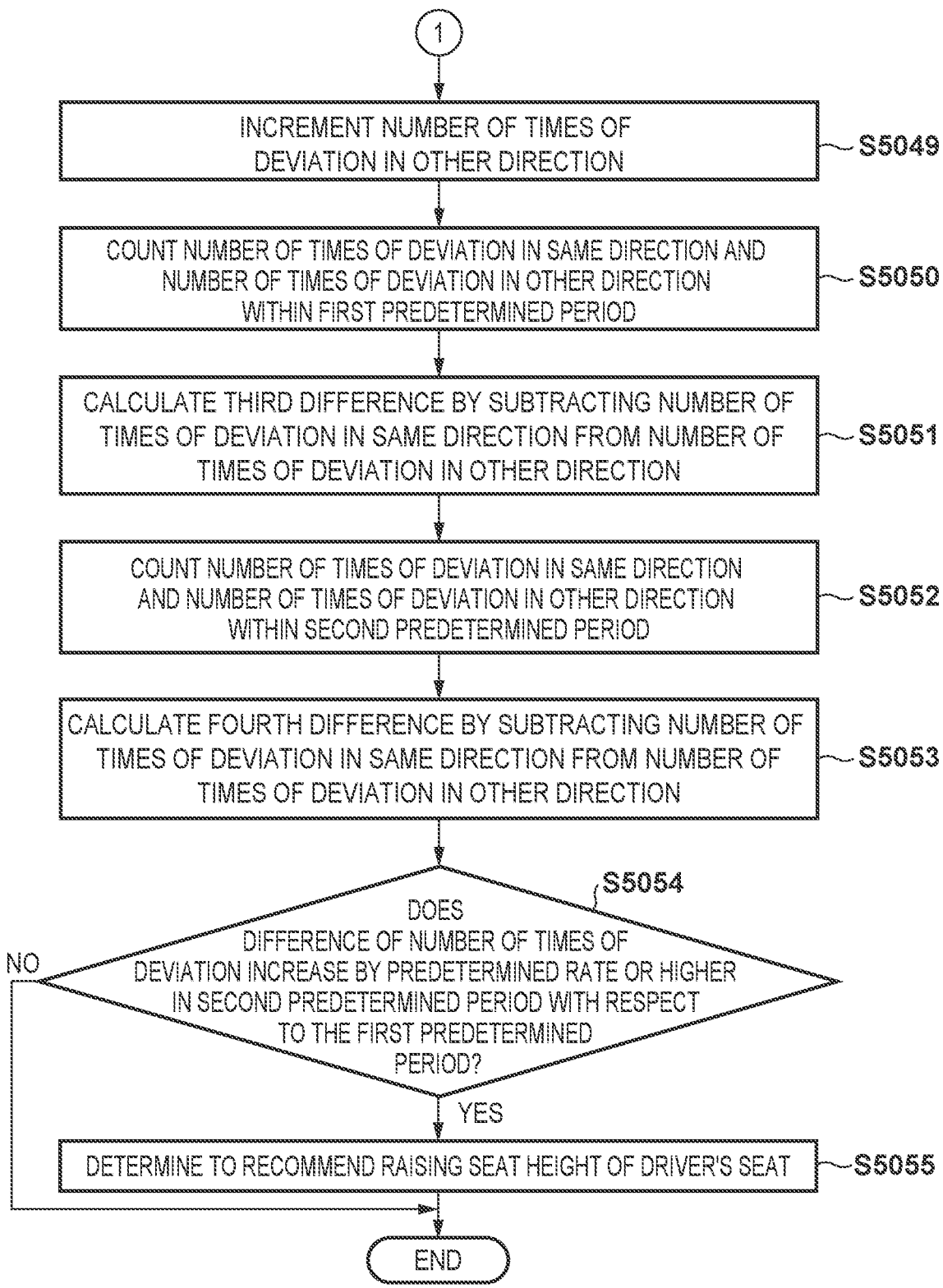

Furthermore, by comparing the difference of the numbers of times of deviation within a predetermined period with the difference of the numbers of times of deviation within a previous predetermined period, it is possible to grasp whether the difference of the numbers of times of deviation tends to increase and configured so as to recommend an appropriate driving posture when the difference of the numbers of times of deviation tends to increase. As a result, an appropriate driving posture can be recommended in a case where the posture gradually changes to an inappropriate posture without the driver's awareness. Accordingly, the process illustrated in FIGS. 7A and 7B is ended.

On the other hand, in the present embodiment, the recommendation of a driving posture is controlled according to whether the difference between the number of times of deviation in the same direction as the extending direction of the curve and the number of times of deviation in the other direction within a predetermined period increases by a predetermined rate or higher.

As a result, it is possible to recommend an appropriate driving posture only when the deviation is estimated to be caused by the driving posture, and an appropriate driving posture can be recommended in a case where the posture gradually changes to an inappropriate posture without the driver's awareness.

In the present embodiment, the predetermined rate is 10%, but is not limited to this value. For example, a value of about several % to 10% may be used.

Furthermore, in the present embodiment, the first predetermined period is set to the time period from the latest two months ago to one month ago, and the second predetermined period is set to a time period from the latest one month ago to the present. However, the present invention is not limited to this example, and other periods may be applied. For example, the first predetermined period may be from the latest four weeks ago to two weeks ago, and the second predetermined period may be from the latest two weeks ago to the present, or other periods may be applied.

In addition, the first predetermined period and the second predetermined period may overlap at least partially. For example, when the first predetermined period is 30 days from January 1 to January 30, the second predetermined period may be 30 days from January 2 to January 31. In this manner, the increase and decrease in the difference of the numbers of times of deviation may be measured as a moving average. As a result, in a case where the posture gradually changes unconsciously, the change can be easily detected.

[Modifications]

In each of the above-described embodiments, the number of times of deviation is counted when the vehicle 1 deviates from the dividing line. However, the number of times of deviation is not necessarily counted, and the case of counting may be limited.

Figure 8:
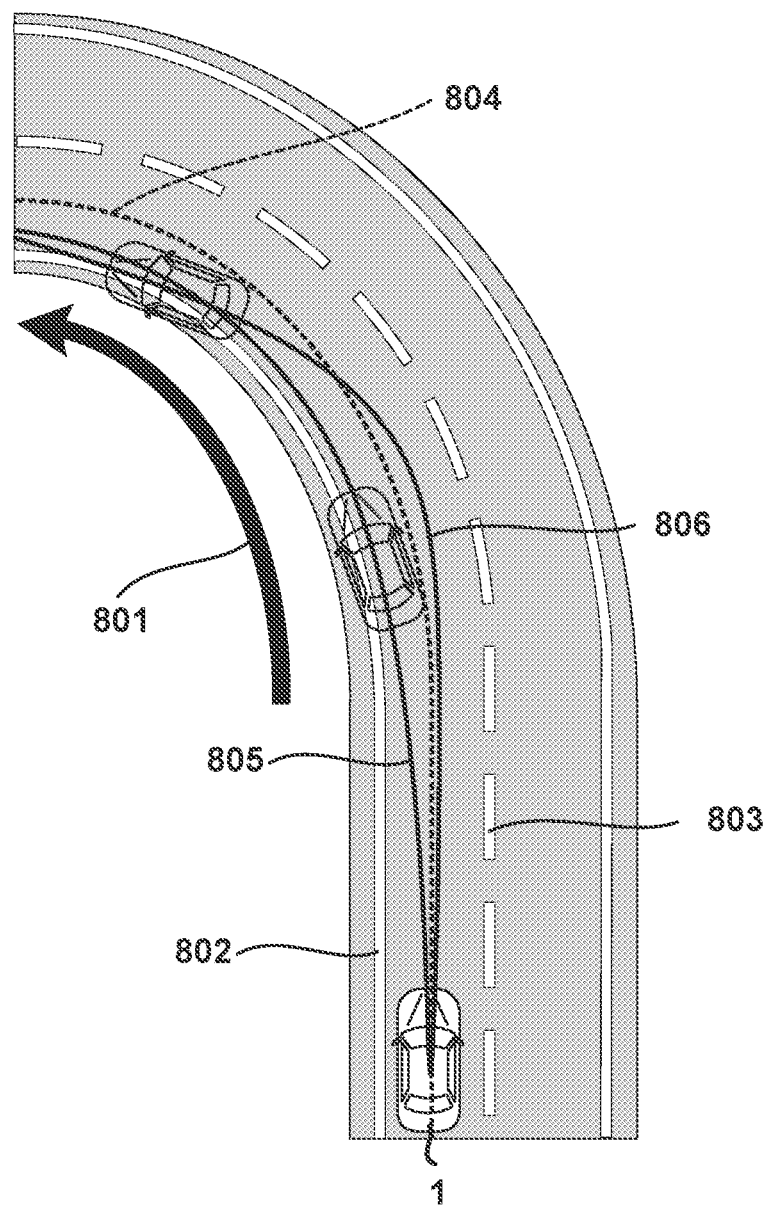
FIG. 8 is an explanatory diagram illustrating an application scene (deviation in the same direction) of a modification.

For example, FIG. 8 is an explanatory diagram illustrating an application scene (deviation in the same direction) of a present modification. Similarly to FIG. 5, the vehicle 1 travels along the curve in which the extending direction 801 of the curve is the left direction. A reference line 804 is set for the curve, and the direction of the first deviation from the reference line 804 in the curve is detected. For example, when the center of the vehicle 1 first deviates from the reference line 804 by a predetermined amount or more, the deviation is determined as the first deviation.

When the vehicle 1 travels like a trajectory 805, the direction of the first deviation from the reference line 804 in the curve is the left direction. After that, the vehicle 1 deviates from the dividing line 802 in the same direction (left direction) as the extending direction (left direction) of the curve. In such a case, the number of times of deviation in the same direction is counted. When the vehicle 1 travels like a trajectory 806, the direction of the first deviation from the reference line 804 in the curve is the right direction. After that, the vehicle 1 deviates from the dividing line 802 in the same direction (left direction) as the extending direction (left direction) of the curve. In such a case, the number of times of deviation in the same direction is not counted. This is not because the driving posture is the cause of the deviation, but because there is a high possibility that the driving is meandering driving caused by driving skills or the like. In this case, the ECU 134 may activate a lane keeping assistance system (LKAS) to perform driving assistance.

Figure 9:
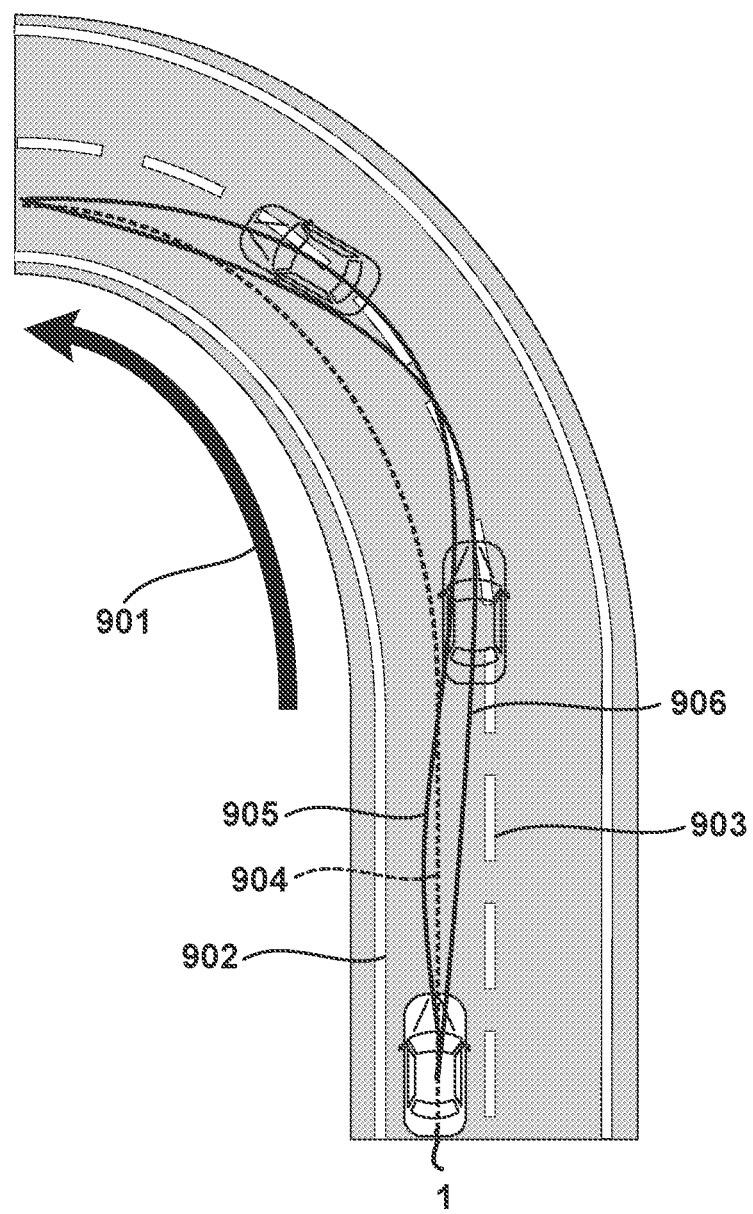
FIG. 9 is an explanatory diagram illustrating an application scene (deviation in the other direction) of the modification.

Similarly, FIG. 9 is an explanatory diagram illustrating an application scene (deviation in the other direction) of the present modification. Similarly to FIG. 8, the vehicle 1 travels along the curve in which the extending direction 901 of the curve is the left direction. A reference line 904 is set for the curve, and the direction of the first deviation from the reference line 904 in the curve is detected. For example, when the center of the vehicle 1 first deviates from the reference line 904 by a predetermined amount or more, the deviation is determined as the first deviation.

When the vehicle 1 travels like a trajectory 905, the direction of the first deviation from the reference line 904 in the curve is the left direction. After that, the vehicle 1 deviates from the dividing line 903 in the other direction (right direction) opposite to the extending direction (left direction) of the curve. In such a case, the number of times of deviation in the other direction is not counted. This is not because the driving posture is the cause of the deviation, but because there is a high possibility that the driving is meandering driving caused by driving skills or the like. In this case, the ECU 134 may activate a lane keeping assistance system (LKAS) to perform driving assistance. When the vehicle 1 travels like a trajectory 906, the direction of the first deviation from the reference line 904 in the curve is the right direction. After that, the vehicle 1 deviates from the dividing line 903 in the other direction (right direction) opposite to the extending direction (left direction) of the curve. In such a case, the number of times of deviation in the other direction is counted.

In this way, when the deviation from the dividing line occurs when the deviation direction in which the center of the vehicle 1 first deviates from the reference line by a predetermined amount or more and the deviation direction from the dividing line are the same direction, the deviation from the dividing line is counted as the number of times of deviation in the same direction or the number of times of deviation in the other direction. As a result, it is possible to recommend the driving posture only when there is a high possibility that the deviation is caused by the driving posture.

The reference line can be, for example, a line extending through the center of the driving lane. Alternatively, the reference line may be an ideal trajectory of the center of the vehicle 1 by driving of a driver having a high driving skill.

Figure 10:
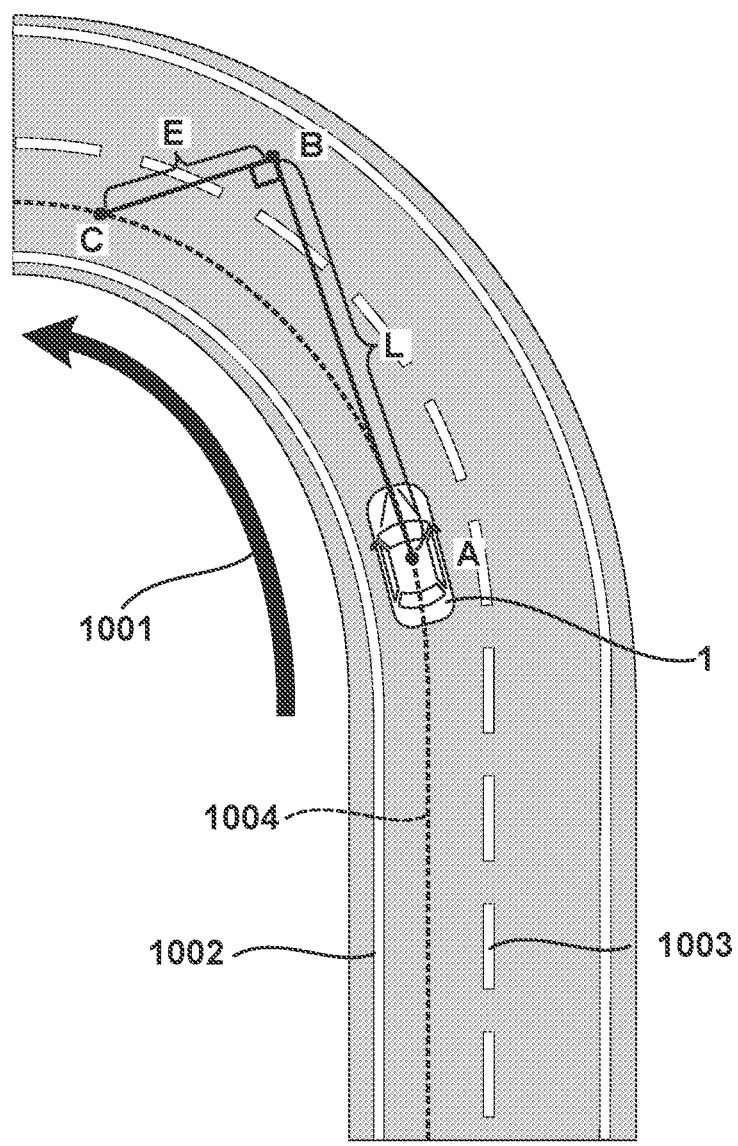
FIG. 10 is an explanatory diagram of a method for calculating an ideal reference line.
Figure 11:
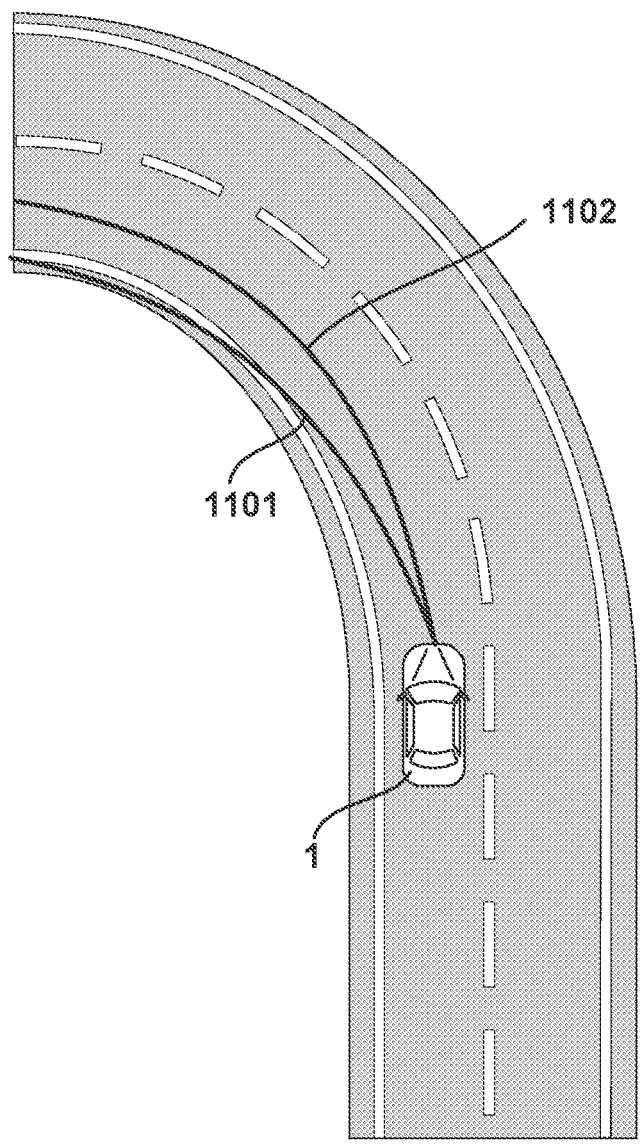
FIG. 11 is an explanatory diagram of a method for calculating an ideal reference line.

An example of a method for calculating an ideal reference line will be described with reference to FIGS. 10 and 11. First, a trajectory at the center of the road, trajectories of left and right dividing lines, and a road shape are calculated after traveling in a curve. Then, a model traveling curvature k at a forward gaze distance L is calculated from the calculated road shape, and the model travel trajectory is calculated.

When a distance between a point B whose distance from the center of the vehicle is a forward gaze distance L [m] on a straight line AB extending through the position of the center of the vehicle 1 and extending in the longitudinal direction of the vehicle 1, and an intersection C between a line extending through the point B perpendicularly intersecting the straight line AB and a road center trajectory 1004 is defined as a forward gaze error E [m], the model traveling curvature k can be calculated using the following equation.

Model traveling curvature $k=2E/L^2$

Then, the longest forward gaze distance L at which the model travel trajectory does not deviate from the left and right dividing lines even in consideration of the vehicle width is determined. In FIG. 11, a trajectory 1101 is a model travel trajectory when the forward gaze distance L=10 m, and a trajectory 1102 is a model travel trajectory when the forward gaze distance L=40 m. When L is long, the vehicle deviates inward, and thus the maximum value of L is calculated under the restriction that the vehicle does not deviate. Then, the model travel trajectory at the longest forward gaze distance L is calculated as an ideal reference line.

In each of the above embodiments, as an example of notifying the recommendation content of the driving posture, an example of recommending raising or lowering the seat height of the driver's seat is described. However, the recommendation content is not limited to changing the seat height of the driver. For example, it may be configured such that it is recommended to increase the height of the line of sight by changing the reclining seat in the vertical direction or to decrease the height of the line of sight by changing the reclining seat in the horizontal direction.

In addition, after the vehicle 1 is parked and the engine is turned off, when the engine is started next time, detailed coaching may be performed. The coaching is not merely a recommendation, but provides a specific procedure for improvement. For example, it may be configured such that voice guidance and/or display of "Please raise the seat height of the driver's seat by two levels" are or is performed by voice and/or display on the display, and voice guidance and/or display of "The seat height is an appropriate height" are or is performed when the driver manually changes the seat height to the recommended height. As a result, the driver can easily recognize how much the seat height needs to be changed. The coaching may be performed not only for the adjustment of the seat height but also for the adjustment of the position of the reclining seat. Further, at the time of coaching, the adjustment of the angle (height) and the front-rear position of the steering operator 113 (steering wheel) may be further recommended.

In addition, a driver monitor camera that captures an image of the inside of the vehicle may be provided, the posture of the driver may be detected by analyzing the captured image, and an appropriate seat height of the driver's seat may be recommended based on the posture. For example, the height of the driver's line of sight can be estimated from the captured image, and the recommended seat height can be determined based on a difference from an appropriate height.

In addition, when the frequency of deviation in the same direction or the frequency of deviation in the other direction decreases after the execution of the recommendation of the driving posture, it is determined that the posture has been improved, and the notification for recommending an appropriate driving posture may be stopped. For example, the recommendation content of the driving posture is notified by voice, lighting of an icon indicating posture improvement, or the like after traveling in a curve. Thereafter, when the frequency of deviation in the same direction or the frequency of deviation in the other direction decreases, the periodic voice notification is stopped, or the notification is stopped by turning off the lighting of the icon. This makes it possible to prevent excessive recommendation when improvement in posture is observed. Similarly, it may be configured that the notification may be stopped when the coaching is completed.

Other Embodiments

In addition, a vehicle control program for implementing one or more functions described in the embodiments is supplied to a system or apparatus via a network or a storage medium, and one or more processors in a computer of the system or apparatus can read and execute the program. The present invention can also be implemented by the above-described aspect.

The invention is not limited to the foregoing embodiments, and various variations/changes are possible within the spirit of the invention.

Summary of Embodiments

An information processing apparatus (for example, 134) according to a first aspect is
  an information processing apparatus that assists driving of a vehicle (for example, 1) and includes:
  a detection unit (for example, 12, 134) configured to detect deviation from a dividing line (for example, 502, 503) that defines a driving lane of the vehicle when the vehicle travels on a curve; and
  a control unit (for example, 134) configured to control a process for recommending a driving posture to a driver of the vehicle based on an extending direction of the curve and a deviation direction of the dividing line in which the deviation has been detected with respect to the vehicle.

As a result, it is possible to recommend an appropriate driving posture in consideration of a situation when the deviation occurs.

In the information processing apparatus (for example, 134) according to a second aspect,
  the control unit controls the process for recommending a driving posture based on whether the deviation direction is the same direction as the extending direction or is the other direction opposite to the extending direction.

As a result, it is possible to recommend an appropriate driving posture according to whether there are more deviations in the same direction as the extending direction of the curve or there are more deviations in the other direction.

In the information processing apparatus (for example, 134) according to a third aspect,
  the control unit determines to recommend raising a seat height of a driver's seat when the number of times of deviation in the same direction within a predetermined period exceeds a threshold.

When the seat height of the driver's seat is low, the line of sight of the occupant tends to be farther than a reference point, and it is difficult to see a position close to the vehicle. Therefore, it is easy to perform the steering operation by looking at a distant situation, the timing of the steering is advanced, and deviation from the dividing line in the same direction as the extending direction of the curve is likely to occur. Since it is estimated that the seat height is low when there are more deviations in the same direction, it is possible to prompt the driver to take an appropriate posture by determining to recommend raising the seat height of the driver's seat.

In the information processing apparatus (for example, 134) according to a fourth aspect,
  the control unit determines to recommend lowering the seat height of the driver's seat when the number of times of deviation in the other direction within a predetermined period exceeds a threshold.

When the seat height of the driver's seat is high, the line of sight of the occupant tends to be closer than the reference point, and it is easier to pay attention to a position close to the vehicle 1 than a position far from the vehicle 1. Therefore, it is easy to perform the steering operation while looking at a close situation, and that causes the delay on noticing the curve and the timing of the steering, so that deviation from the dividing line in the other direction opposite to the extending direction of the curve is likely to occur. Since it is estimated that the seat height is low when there are more deviations in the other direction, it is possible to prompt the driver to take an appropriate posture by determining to recommend lowering the seat height of the driver's seat.

In the information processing apparatus (for example, 134) according to a fifth aspect, the control unit counts the number of times of deviation in the same direction and the number of times of deviation in the other direction within a predetermined period, and determines to recommend raising the seat height of the driver's seat when a difference obtained by subtracting the number of times of deviation in the other direction from the number of times of deviation in the same direction exceeds a threshold.

In the case of deviation biased in one direction, it can be estimated that there is a high possibility that the deviation is caused by the driving posture, but in a case where deviation occurs in both directions by a certain amount or more, it can be estimated that there is a high possibility that the deviation is not caused by the driving posture. As a result, it is possible to prompt the driver to take an appropriate posture only when there is a high possibility that the deviation is caused by the driving posture.

In the information processing apparatus (for example, 134) according to a sixth aspect, the control unit counts the number of times of deviation in the same direction and the number of times of deviation in the other direction within a predetermined period, and determines to recommend lowering the seat height of the driver's seat when a difference obtained by subtracting the number of times of deviation in the same direction from the number of times of deviation in the other direction exceeds a threshold.

In the case of deviation biased in one direction, it can be estimated that there is a high possibility that the deviation is caused by the driving posture, but in a case where deviation occurs in both directions by a certain amount or more, it can be estimated that there is a high possibility that the deviation is not caused by the driving posture. As a result, it is possible to prompt the driver to take an appropriate posture only when there is a high possibility that the deviation is caused by the driving posture.

In the information processing apparatus (for example, 134) according to a seventh aspect, the control unit counts the number of times of deviation in the same direction and the number of times of deviation in the other direction within a first predetermined period, calculates a first difference obtained by subtracting the number of times of deviation in the other direction from the number of times of deviation in the same direction, counts the number of times of deviation in the same direction and the number of times of deviation in the other direction within a second predetermined period after the first predetermined period, calculates a second difference obtained by subtracting the number of times of deviation in the other direction from the number of times of deviation in the same direction, and determines to recommend raising the seat height of the driver's seat when the difference of the numbers of times of deviation increases by a predetermined rate or higher in the second predetermined period with respect to the first predetermined period.

As a result, by considering the differences of the numbers of times of deviation, it is possible to recommend an appropriate driving posture only when the deviation is estimated to be caused by the driving posture. In addition, by checking a change for each time period, an appropriate driving posture can be recommended in a case where the posture gradually changes to an inappropriate posture without the driver's awareness.

In the information processing apparatus (for example, 134) according to an eighth aspect, the control unit counts the number of times of deviation in the same direction and the number of times of deviation in the other direction within a first predetermined period, calculates a third difference obtained by subtracting the number of times of deviation in the same direction from the number of times of deviation in the other direction, counts the number of times of deviation in the same direction and the number of times of deviation in the other direction within a second predetermined period after the first predetermined period, calculates a fourth difference obtained by subtracting the number of times of deviation in the same direction from the number of times of deviation in the other direction, and determines to recommend lowering the seat height of the driver's seat when the difference of the numbers of times of deviation increases by a predetermined rate or higher in the second predetermined period with respect to the first predetermined period.

As a result, by considering the differences of the numbers of times of deviation, it is possible to recommend an appropriate driving posture only when the deviation is estimated to be caused by the driving posture. In addition, by checking a change for each time period, an appropriate driving posture can be recommended in a case where the posture gradually changes to an inappropriate posture without the driver's awareness.

In the information processing apparatus (for example, 134) according to a ninth aspect, the detection unit sets a reference line (for example, 804, 904) for the curve, and further detects a deviation direction of a first deviation from the reference line in the curve, and in a case where deviation from the dividing line occurs when the deviation direction in which the center of the vehicle first deviates from the reference line by a predetermined amount or more is a same direction as the deviation direction from the dividing line, the control unit counts the deviation from the dividing line as the number of times of deviation in the same direction or the number of times of deviation in the other direction.

As a result, it is possible to recommend the driving posture only when there is a high possibility that the deviation is caused by the driving posture.

In the information processing apparatus (for example, 134) according to a tenth aspect, the control unit controls a notification unit to make a recommendation in response to a determination to recommend raising the seat height of the driver's seat.

As a result, it is possible to recognize that it is necessary to raise the seat height of the driver's seat in the middle of traveling.

In the information processing apparatus (for example, 134) according to an eleventh aspect,
the control unit controls a notification unit to make a recommendation in response to a determination to recommend lowering the seat height of the driver's seat.

As a result, it is possible to recognize that it is necessary to lower the seat height of the driver's seat in the middle of traveling.

In the information processing apparatus (for example, 134) according to a twelfth aspect, the control unit controls a notification unit to make a recommendation regarding the driving posture when an engine of the vehicle is started.

As a result, it is possible to recognize the recommendation content for taking an appropriate driving posture before the start of driving. Therefore, it is possible to recommend, at an appropriate time, an operation that should not be performed during driving, such as changing the seat height of the driver's seat or adjusting the reclining seat.

In the information processing apparatus (for example, 134) according to a thirteenth aspect,
the control unit performs an operation corresponding to a recommendation content based on an operation instruction from the driver in response to the recommendation.

As a result, for example, when an instruction (for example, pressing of an enter button) to perform an operation corresponding to the recommendation content is received from the driver, the operation can be automatically performed. Therefore, it is possible to correct the driving posture to an appropriate driving posture with a simple configuration.

In the information processing apparatus (for example, 134) according to a fourteenth aspect,
the control unit adjusts the seat height of the driver's seat based on an operation instruction from the driver in response to the recommendation.

As a result, for example, when an instruction (for example, pressing of an enter button) to perform an operation is received from the driver, the seat height of the driver's seat can be automatically adjusted to the appropriate height. Therefore, the seat height can be easily adjusted.

A vehicle (for example, 1) according to a fifteenth aspect is
a vehicle that includes the information processing apparatus according to any one of the first to fourteenth aspects.

Accordingly, the processing of the information processing apparatus can be implemented in the vehicle.

A method for controlling an information processing apparatus (for example, 134) according to a sixteenth aspect is
a method for controlling an information processing apparatus that assists driving of a vehicle (for example, 1), and includes
detecting (for example, S302, S303) deviation from a dividing line that defines a driving lane of the vehicle when the vehicle travels on a curve; and
controlling (for example, S304) a recommendation process of a driving posture for a driver of the vehicle based on an extending direction of the curve and a deviation direction of a dividing line from which the deviation has been detected with respect to the vehicle.

As a result, it is possible to recommend an appropriate driving posture in consideration of a situation when the deviation occurs.

A non-transitory computer-readable storage medium according to a seventeenth aspect
stores a program for causing a computer to function as the information processing apparatus according to any one of the first to fourteenth aspects.

As a result, the processing of the information processing apparatus can be implemented by the computer.

According to the present invention, it is possible to recommend an appropriate posture in consideration of a deviation direction from a driving lane.

What is claimed is:

1. An information processing apparatus that assists driving of a vehicle, the information processing apparatus comprising:
one or more memories storing instructions; and
one or more processors executing the instructions to:
detect deviation from a dividing line that defines a driving lane of the vehicle when the vehicle travels on a curve; and
control a process for recommending a driving posture to a driver of the vehicle based on an extending direction of the curve and a deviation direction of the dividing line from which the deviation has been detected with respect to the vehicle,
wherein the one or more processors execute the instructions to control the process for recommending a driving posture based on whether the deviation direction is a first direction that is the same as the extending direction or is a second direction opposite to the extending direction, and
wherein the one or more processors execute the instructions to determine to recommend raising a seat height of a driver's seat when the number of times of deviation in the first direction within a predetermined period exceeds a threshold,
wherein the one or more processors execute the instructions to control a notification unit to make a recommendation regarding the driving posture when an engine of the vehicle is started; and
wherein the one or more processors execute the instructions to perform an operation corresponding to a recommendation content based on an operation instruction from the driver in response to the recommendation.

2. The information processing apparatus according to claim 1, wherein the one or more processors execute the instructions to determine to recommend lowering a seat height of a driver's seat when the number of times of deviation in the second direction within a predetermined period exceeds a threshold.

3. The information processing apparatus according to claim 1, wherein the one or more processors execute the instructions to count the number of times of deviation in the first direction and the number of times of deviation in the second direction within a predetermined period, and determine to recommend raising the seat height of the driver's seat when a difference obtained by subtracting the number of times of deviation in the second direction from the number of times of deviation in the first direction exceeds a threshold.

4. The information processing apparatus according to claim 1, wherein the one or more processors execute the instructions to count the number of times of deviation in the first direction and the number of times of deviation in the second direction within a predetermined period, and determine to recommend lowering the seat height of the driver's seat when a difference obtained by subtracting the number of times of deviation in the first direction from the number of times of deviation in the second direction exceeds a threshold.

5. The information processing apparatus according to claim 1, wherein the one or more processors execute the instructions to
count the number of times of deviation in the first direction and the number of times of deviation in the second direction within a first predetermined period, calculate a first difference obtained by subtracting the number of times of deviation in the second direction from the number of times of deviation in the first direction,
count the number of times of deviation in the first direction and the number of times of deviation in the second direction within a second predetermined period after the first predetermined period, calculate a second difference obtained by subtracting the number of times of deviation in the second direction from the number of times of deviation in the first direction, and
determine to recommend raising the seat height of the driver's seat when the difference of the numbers of times of deviation increases by a predetermined rate or higher in the second predetermined period with respect to the first predetermined period.

6. The information processing apparatus according to claim 1, wherein the one or more processors execute the instructions to
count the number of times of deviation in the first direction and the number of times of deviation in the second direction within a first predetermined period, calculate a third difference obtained by subtracting the number of times of deviation in the first direction from the number of times of deviation in the second direction, and
count the number of times of deviation in the first direction and the number of times of deviation in the second direction within a second predetermined period after the first predetermined period, calculate a fourth difference obtained by subtracting the number of times of deviation in the first direction from the number of times of deviation in the second direction, and
determine to recommend lowering the seat height of the driver's seat when the difference of the numbers of times of deviation increases by a predetermined rate or higher in the second predetermined period with respect to the first predetermined period.

7. The information processing apparatus according to claim 1, wherein
the one or more processors execute the instructions to set a reference line for the curve, and further detect a deviation direction of a first deviation from the reference line in the curve, and
in a case where deviation from the dividing line occurs when the deviation direction in which the center of the vehicle first deviates from the reference line by a predetermined amount or more is a first direction as the deviation direction from the dividing line, the one or more processors execute the instructions to count the deviation from the dividing line as the number of times of deviation in the first direction or the number of times of deviation in the second direction.

8. The information processing apparatus according to claim 1, wherein the one or more processors execute the instructions to control a notification unit to make a recommendation in response to a determination to recommend raising the seat height of the driver's seat.

9. The information processing apparatus according to claim 2, wherein the one or more processors execute the instructions to control a notification unit to make a recommendation in response to a determination to recommend lowering the seat height of the driver's seat.

10. The information processing apparatus according to claim 1, wherein the one or more processors execute the instructions to adjust the seat height of the driver's seat based on an operation instruction from the driver in response to the recommendation.

11. A vehicle comprising the information processing apparatus according to claim 1.

12. A method for controlling an information processing apparatus that assists driving of a vehicle, the method comprising:
detecting deviation from a dividing line that defines a driving lane of the vehicle when the vehicle travels on a curve; and
controlling a process for recommending a driving posture to a driver of the vehicle based on an extending direction of the curve and a deviation direction of a dividing line from which the deviation has been detected with respect to the vehicle;
wherein the process for recommending the driving posture is controlled based on whether the deviation direction is a first direction that is the same as the extending direction or is a second direction opposite to the extending direction, and
wherein a raising of a seat height of a driver's seat is determined to be recommended when the number of times of deviation in the first direction within a predetermined period exceeds a threshold,
wherein the one or more processors execute the instructions to control a notification unit to make a recommendation regarding the driving posture when an engine of the vehicle is started, and
wherein the one or more processors execute the instructions to perform an operation corresponding to a recommendation content based on an operation instruction from the driver in response to the recommendation.

13. A non-transitory computer-readable storage medium storing a program for causing a computer to execute a method for controlling an information processing apparatus that assists driving of a vehicle, the method comprising:
detecting deviation from a dividing line that defines a driving lane of the vehicle when the vehicle travels on a curve; and
controlling a process for recommending a driving posture to a driver of the vehicle based on an extending direction of the curve and a deviation direction of a dividing line from which the deviation has been detected with respect to the vehicle;
wherein the process for recommending the driving posture is controlled based on whether the deviation direction is a first direction that is the same as the extending direction or is a second direction opposite to the extending direction, and
wherein a raising of a seat height of a driver's seat is determined to be recommended when the number of times of deviation in the first direction within a predetermined period exceeds a threshold,
wherein the one or more processors execute the instructions to control a notification unit to make a recommendation regarding the driving posture when an engine of the vehicle is started, and wherein the one or more processors execute the instructions to perform an operation corresponding to a recommendation content based on an operation instruction from the driver in response to the recommendation.

\* \* \* \* \*